March 14, 1933.　　　J. G. BLUNT　　　1,901,019
BRAKE MECHANISM
Filed Jan. 3, 1931　　　3 Sheets-Sheet 1
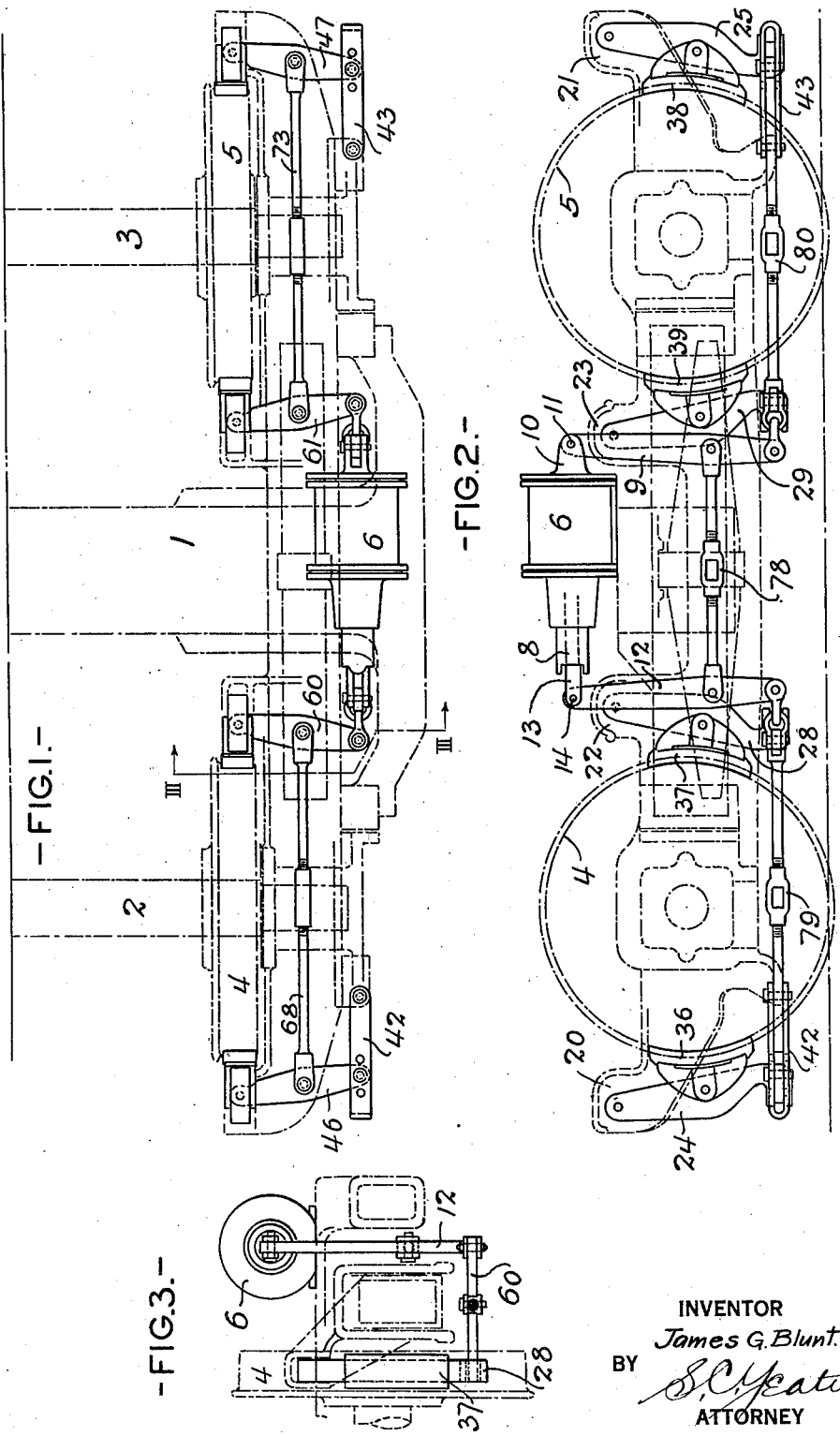
INVENTOR
James G. Blunt.
BY
ATTORNEY

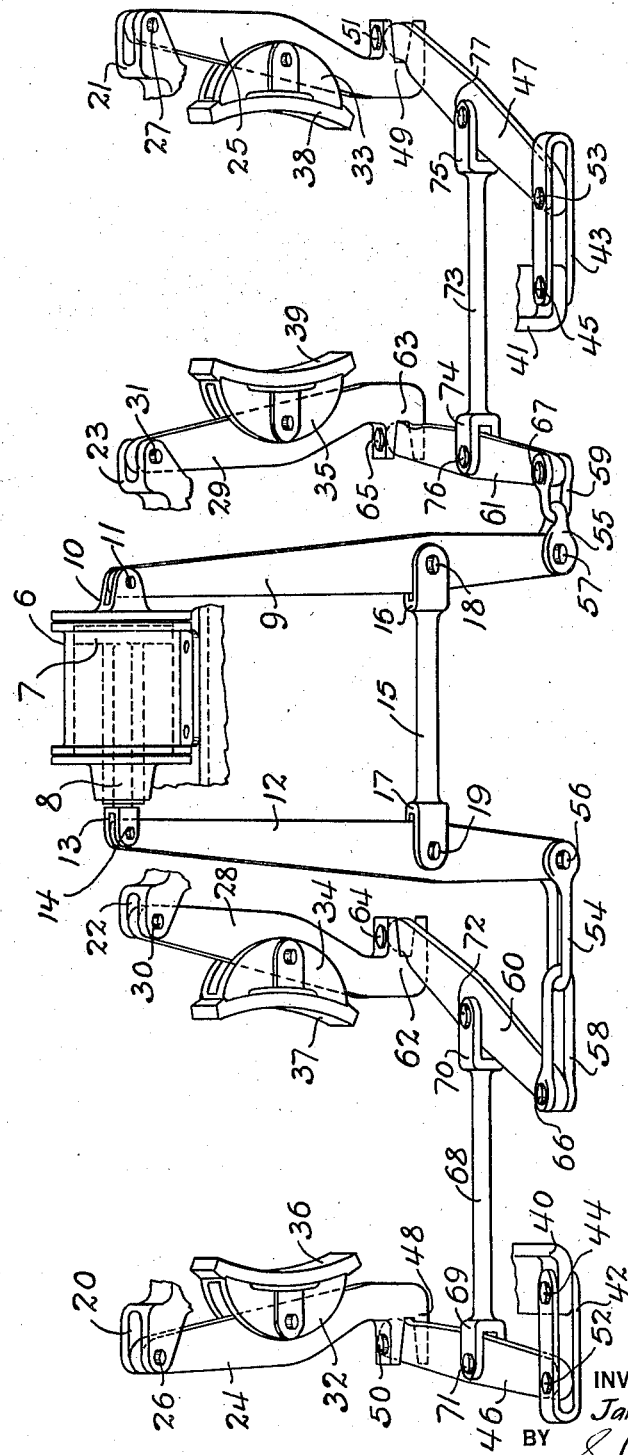

March 14, 1933.  J. G. BLUNT  1,901,019
BRAKE MECHANISM
Filed Jan. 3, 1931  3 Sheets-Sheet 3
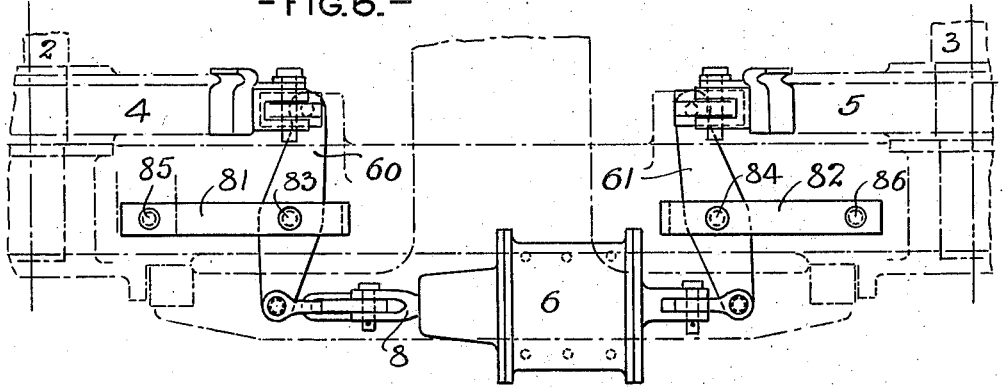
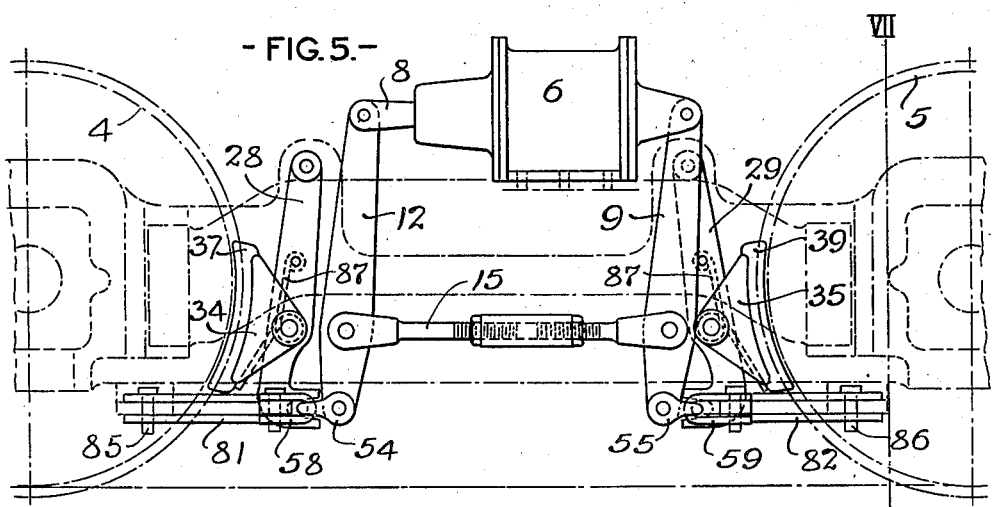
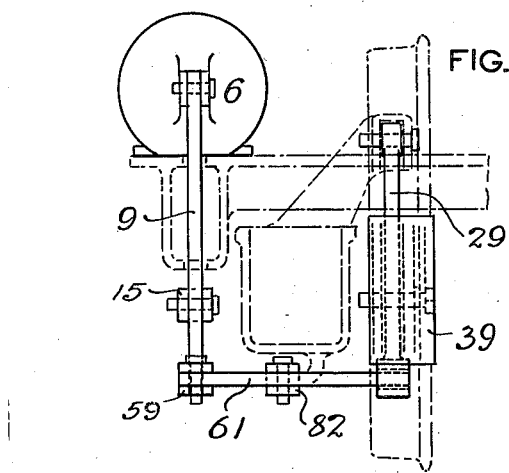
INVENTOR
James G. Blunt.
BY
ATTORNEY Patented Mar. 14, 1933

1,901,019

UNITED STATES PATENT OFFICE

JAMES G. BLUNT, OF SCHENECTADY, NEW YORK

BRAKE MECHANISM

Application filed January 3, 1931. Serial No. 506,340.

This invention relates to brake mechanism, and particularly to brake rigging adapted to be employed on railway vehicle wheels, as for instance the wheels of trucks.

An object of the invention is to provide a novel brake arrangement which will comprise two independent sets of brake rigging, one on each side of the vehicle, with means to operate each set independently, and to provide a structure embodying these features, which will be a durable and simplified construction involving a minimum number of parts.

Other objects and advantages of the invention will be apparent from the following description of a preferred embodiment of the same, taken in connection with the accompanying drawings, in which:

Figure 1 is a plan view of one half of a truck frame, having a pair of axles, with wheels attached thereto, and with the structural embodiment of this invention applied to the same; Fig. 2 is a side elevation of the same; Fig. 3 is a section on the line III—III of Fig. 1; Fig. 4 is an enlarged diagrammatic view of a set of brake rigging including a cylinder and piston actuating means; Fig. 5 is a side elevation showing a modified form of the invention; Fig. 6 is a plan view of the form shown in Fig. 5; and Fig. 7 is a view taken on the line VII—VII of Fig. 5.

Referring in detail to the drawings, a locomotive truck is indicated by the numeral 1, having a pair of axles, 2 and 3, with wheels, 4 and 5, mounted thereon on one side of the same, only one-half of the truck being shown, the truck axles and wheels being indicated by broken lines (Figs. 1 and 2).

The wheels on each of the opposite sides of the truck are provided with a set of brake rigging, the following description of which will be understood to apply equally to each of the two separate sets.

A cylinder 6, is mounted on the side of the truck frame, and is provided with a piston 7, having a piston rod, 8, associated therewith, and extending through one end of said cylinder. A source of fluid under pressure and means for introducing and exhausting the fluid into and from the cylinder are provided to actuate the said piston. These are not illustrated, but may be of any preferred or well-known type of construction, it being understood that the cylinder of both sets of brake rigging will be supplied from a common source of fluid pressure, having a single control mechanism. A downwardly extending main power lever 9, is pivotally connected to jaws, 10, formed on the cylinder 6, by means of a pin 11, and a second downwardly extending main power lever 12, is connected to jaws, 13, formed on the end of the piston rod by means of a pin 14. A connecting rod 15, is provided between the levers, 9 and 12, its opposite ends being pivotally connected to the respective levers by the jaws, 16 and 17, formed on the ends of the rod and the pins 18 and 19, passing through said jaws and levers.

Formed on the side of the truck frame are outer jaw members, 20 and 21, and inner jaw members, 22 and 23. Outer brake shoe hanger levers, 24 and 25, are held in the jaws, 20 and 21, respectively, by means of the pins, 26 and 27, and inner brake shoe hanger levers, 28 and 29, are held in the jaws, 22 and 23, respectively, by means of the pins, 30 and 31. Brake heads, 32, 33, 34 and 35, are pivotally connected to the hanger levers, 24, 25, 28 and 29, respectively. The brake heads, 32 and 34 are provided with brake shoes, 36 and 37, respectively, and the brake heads, 33 and 35, are provided with shoes, 38 and 39, respectively. The brake heads and shoes are located on the hanger levers near the horizontal line of the axles, those on the outer hanger levers, 24 and 25, being secured to the inner respective sides of the same, and the brake heads and shoes on the inner hanger levers, 28 and 29, being secured on the outer respective sides of the same, so that the shoes, 36 and 37, are positioned so as to be appliable to the opposite sides of the wheel, 4, and the shoes, 38 and 39 are positioned so as to be appliable to the opposite sides of the wheel, 5. The respective jaws 20—23 form fulcrums for the adjoining hanger levers, and the jaws of the respective pairs are spaced apart at such distances from each other that, when the levers and their brake heads and shoes are in normal gravitated position, they will hang, by virtue of their own weight to position the shoes out of contact with the wheels.

Projecting lugs, 40 and 41, are formed on the lower sides of the truck frame, and fulcrum links, 42 and 43, are connected thereto by pins, 44 and 45, respectively. Outer, substantially horizontal levers, 46 and 47, are connected at their respective inner ends to the lower ends of the outer brake hanger levers, 24 and 25, by means of jaws, 48 and 49, formed on the ends of the hanger levers, and pins, 50 and 51, passed through the jaws and horizontal levers. The outer ends of the levers, 46 and 47, are pivotally connected to the fulcrum links, 42 and 43, respectively, by means of pins, 52 and 53.

At the lower ends of the power levers 9 and 12, clevises, 54 and 55, are connected by pins, 56 and 57, respectively, which clevises are in turn engaged with clevises, 58 and 59, respectively. Inner, substantially horizontal, floating levers, 60 and 61, are connected at the inner ends to the respective lower ends of the inner brake hanger levers, 28 and 29, by means of jaws, 62 and 63, respectively, formed on said ends of the hanger levers, and pins, 64 and 65, passed through said jaws and horizontal levers. The outer ends of the levers, 60 and 61, are pivotally connected to the clevises, 58 and 59, by means of pins, 66 and 67. A connecting rod, 68, is provided with jaws, 69 and 70, at its opposite ends, which centrally engage the levers, 46 and 60, respectively, and are pivotally connected thereto by means of the respective pins, 71 and 72. A corresponding connecting rod, 73, is provided with jaws, 74 and 75, at its opposite ends, which centrally engage the levers, 61 and 47, respectively, and are pivotally connected thereto by means of the respective pins, 76 and 77. The connecting rods, 15, 68 and 73, are provided with turn buckles, 78, 79, and 80, respectively (Figs. 1 and 2) by means of which the relative positions of the levers connected by the rods may be adjusted, and the correct adjusted position of the brake shoes with relation to the wheels may be readily obtained.

It will be apparent that when the brakes are in their normal disengaged positions, their weight will hold them in the position shown in Fig. 4, with the piston in inward position. When the fluid pressure is introduced into the cylinder (at the right of the piston, Fig. 4) to actuate the brake mechanism, the piston 7, will be forced outward and will carry with it the upper end of the main lever, 12, and as the connecting rod, 15, holds the levers, 9 and 12, at a fixed distance from each other at the intermediate points of connection, when the upper ends of the levers are forced apart by the piston, the levers will fulcrum on the pins, 18 and 19, and the lower ends of the levers will tend to be brought together, and the force of the piston will be transmitted through the connections and levers aforedescribed to all of the lever hangers, so that the brake shoes will be applied to the sides of the respective wheels. When the fluid pressure is exhausted from the cylinder 6, the brake heads and shoes and respective lever hangers will fall into their normal disengaged position by reason of their own weight, moving the levers and connecting rods attached thereto, and bringing the piston back to its inward position.

In Figures 5, 6 and 7, a modified form of the invention is illustrated, wherein single brake shoes for the wheels are employed instead of the clasp brake arrangement shown in Figs. 1 to 4. In this modified form the cylinder 6, piston 7, piston rod 8, power levers 9 and 12, connecting rod 15, inner brake heads 34 and 35, shoes 37 and 39, hangers 28 and 29, levers 60 and 61, and clevises 54, 55, 58 and 59, are all constructed substantially in the same manner as described with reference to the preceding figures. In the modified structure, however, the levers 60 and 61 are not "floating levers" but are pivotally connected intermediate their ends to the ends of anchors 81 and 82 by pins 83 and 84. The opposite ends of the anchors are pivotally connected to the vehicle frame by pins 85 and 86. It will be apparent that the operation of this form of rigging is substantially the same as described with reference to the clasp brake structure except that the levers 60 and 61 in the present instance are rigidly held by their respective anchors 81 and 82. Springs 87 are provided on the hanger levers and engage the brake shoes to hold the same in proper alignment with the adjacent faces of the wheels.

While there has been hereinbefore described and illustrated a preferred specific embodiment of the invention and one modified form thereof, it will be obvious that many and various other modifications as well as changes in procedure, form, arrangement and construction of parts may be resorted to, and that this invention, therefore, is not limited to the particular embodiments disclosed, but includes all and any such changes and modifications as come within the scope of the invention as defined in the appended claims.

The invention claimed and desired to be secured by Letters Patent is:

1. In a brake rigging for the wheels on one side of a railroad vehicle having a plurality of axles with wheels attached to the ends of said axles; hanger levers; brake shoes attached to said hanger levers adjacent faces of the wheels on said side; a cylinder and a fluid pressure actuated piston therefor; a pair of main power levers; a rigid rod member pivotally connected at its opposite ends to said power levers intermediate the ends thereof, one of said power levers being pivotally connected at its upper end to a fixed member and the other power lever being pivotally connected at its upper end to said piston; substantially horizontal lever members pivotally connected at their inner ends with the lower ends of said hanger levers, and operably connected at their outer ends to the lower ends of the adjacent power levers, whereby the operation of said piston will actuate the rigging and the brake shoes will be engaged with their adjacent wheels.

2. In a brake rigging for the wheels on one side of a railroad vehicle having a plurality of axles with wheels attached to the ends of said axles, hanger levers having brake shoes attached thereto disposed opposite the sides of each of the wheels on said side; a cylinder and a fluid pressure actuated piston therefor, disposed intermediate said hanger levers; a pair of main power levers; a rigid rod member pivotally connected at its opposite ends to said power levers intermediate the ends thereof, one of said power levers being pivotally connected at its upper end to said cylinder and the other power lever being pivotally connected at its upper end to said piston; outer substantially horizontal lever members pivotally connected to the lower ends of the outer hanger levers at their respective inner ends and to the vehicle frame at their outer ends; inner substantially horizontal lever members pivotally connected at their respective inner ends with the lower ends of the inner hanger levers; rigid connecting rods respectively disposed between the adjacent outer and inner substantially horizontal lever members and pivotally connected thereto between the ends thereof; and connecting means between the outer ends of said inner levers and the lower ends of the power levers, whereby the operation of said piston will actuate said rigging and the brake shoes will be engaged with the adjacent wheels.

3. Brake mechanism for railroad vehicles having a plurality of axles and pairs of wheels thereon, comprising in combination independent sets of clasp brake rigging, disposed on each of the opposite sides of said vehicle, each set of rigging comprising hanger levers, having brake shoes attached thereto, disposed on the opposite sides of each of said wheels; a cylinder and fluid pressure actuated piston therefor, disposed on each of said sides of the vehicle, intermediate said hanger levers; a pair of main power levers; a rigid rod member pivotally connected at its opposite ends to the respective power levers between the ends thereof, one of said power levers being pivotally connected at its upper end to said cylinder and the other power lever being pivotally connected at its upper end to said piston; outer substantially horizontal lever members pivotally connected to the lower ends of the outer hanger levers at their respective inner ends and to the vehicle frame at their outer ends; inner substantially horizontal lever members pivotally connected at their respective inner ends with the lower ends of the inner hanger levers; rigid connecting rods respectively disposed between the adjacent outer and inner substantially horizontal lever members and pivotally connected thereto intermediate the ends thereof; and connecting means between the outer ends of said inner substantially horizontal lever members and the lower ends of the power levers, whereby the operation of said pistons will actuate the respective sets of said rigging to which they are attached and the respective brake shoes will be engaged with said wheels.

4. In a clasp brake rigging for the wheels on one side of a railroad vehicle having a plurality of axles with wheels attached to the ends of said axles, hanger levers having brake shoes attached thereto disposed on the opposite sides of each of the wheels on said side; a cylinder and a fluid pressure actuated piston therefor, disposed intermediate said hanger levers; a pair of main power levers; a rigid rod member pivotally connected at its opposite ends to the respective power levers between the ends thereof, one of said power levers being pivotally connected at its upper end to said cylinder and the other power lever being pivotally connected at its upper end to said piston; outer substantially horizontal lever members pivotally connected to the lower ends of the outer hanger levers at their respective inner ends and to the vehicle frame at their outer ends; inner substantially horizontal lever members pivotally connected at their respective inner ends with the lower ends of the inner hanger levers; rigid connecting rods respectively disposed between the adjacent outer and inner substantially horizontal lever members and pivotally connected thereto intermediate the ends thereof; connecting means between the outer ends of the said inner levers and the lower ends of the power levers, whereby the operation of said piston will actuate said rigging and the respective brake shoes will be engaged with said wheels; and means associated with said connecting rods for adjusting the same to vary the relative positions of said levers and said brake shoes.

5. In a railroad vehicle the combination of a pair of supporting wheels at one side of the vehicle; a brake shoe for each of the wheels; a hanger lever connected with each of the brake shoes; an intermediate lever connected with each of the hanger levers; a pair of main actuating levers, one lever of the pair being connected with one of said intermediate levers and the other lever of the pair being connected with the other of said intermediate levers; means connecting the levers of the pair together; and power means connected with the pair, whereby by the operation of said power means the levers of the pair will be simultaneously operated.

6. In a railroad vehicle the combination of a pair of supporting wheels at one side of the vehicle; a pair of brake shoes for each of said wheels, a shoe being disposed on each of the opposite sides of said wheels; a pair of hanger levers for each pair of brake shoes, one hanger lever being connected with each of said shoes; a pair of intermediate levers for each pair of hanger levers, one intermediate lever being connected with each hanger lever; means connecting the intermediate levers of each pair; a pair of main actuating levers, one of the actuating levers being connected with an intermediate lever of one pair of said intermediate levers, and the other actuating lever being connected with an intermediate lever of the other pair of said intermediate levers; means connecting the actuating levers together; and power means connected with the actuating levers whereby by the operation of said power means the actuating levers will be simultaneously operated.

JAMES G. BLUNT.